Oct. 16, 1956     C. L. VICE     2,766,638
WORM GEAR MULTITURN STOP
Filed Feb. 18, 1955
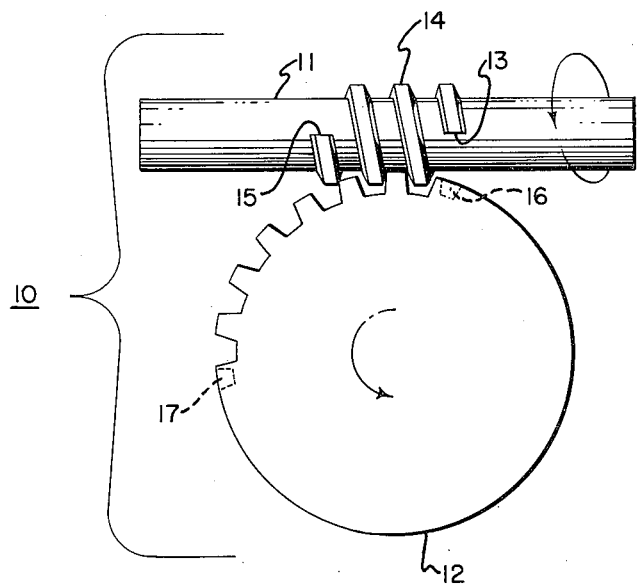
CHARLES L. VICE
*INVENTOR.*
BY
HIS ATTORNEY

United States Patent Office 2,766,638
Patented Oct. 16, 1956

2,766,638
WORM GEAR MULTITURN STOP

Charles L. Vice, San Marino, Calif., assignor to Hoffman Electronics Corporation, a corporation of California Application February 18, 1955, Serial No. 489,197

3 Claims. (Cl. 74—425)

This invention is related to worm gear multiturn stop mechanisms and, more particularly, to an improved worm gear multiturn stop which will exhibit a high degree of accuracy and at the same time preserve simplicity of design.

In the past, many techniques have been employed for providing stopping means for a worm gear set. Techniques thus far developed require the employment of parts in addition to the worm and worm gear for accomplishing a stop at a predetermined disposition of the worm gear set. It would, of course, be highly desirable for the worm gear set itself to provide its own stopping means.

Therefore, it is an object of the present invention to provide a new and useful worm gear multiturn stop.

It is a further object of the present invention to provide a new and useful worm gear multiturn stop in a worm drive set without the employment of additional parts.

According to the present invention, a conventional worm set has a worm with at least one blunt tooth end cut parallel to the worm's axis of rotation and a worm gear having teeth cut over a chosen sector of arc of less than 360°. At the predetermined termination of the worm gear's rotation, the blunt end of the worm's tooth jams against a gear area adjacent to one end of the toother sector of the worm gear to accomplish the stop.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which The sole figure is an elevational view of a worm gear set incorporating self-stopping means according to the present invention.

In the sole figure, worm gear set 10 is composed of worm 11 and worm gear 12. Worm 11 is cut with only enough threads to carry the required tooth contact. Tooth end 13 of worm tooth 14 is cut parallel with the worm shaft. If worm set 10 is to be designed to have two stop positions, then tooth end 15 of worm tooth 14 may be cut in a manner similar to tooth end 13. A chosen sector of worm gear 12, constituting less than 360° of arc, is cut for worm gear teeth.

The worm gear set shown in the sole figure operates as follows. As worm 11 is rotated in a counter-clockwise direction, worm gear 12 is caused to rotate in a counter-clockwise direction. As the toothed portion of worm gear 12 approaches the end of its travel, tooth end 13 of worm tooth 14 approaches contact area 16 of the side surface of worm gear 12 to jam in a normal direction therewith. In actual practice a slip clutch arrangement of some form will be associated with worm 11 to provide for the slippage of the linkage associated with worm 11 until the drive motor associated therewith is shut off. A second multiturn jam stop may be provided by the appropriate cutting of tooth end 15 so that as worm 11 is rotated clockwise worm gear 12 will rotate clockwise until at the end of its travel tooth end 15 will jam against contact area 17 of the opposite side of the gear.

It is self evident that the worm gear said above described would be ideally suited for incorporation in the tuning arrangement of electronic equipment. A key feature of the worm gear set as is above described would be the remarkable accuracy attainable, especially if the worm gear exhibited a large number of threads per inch having a small pitch and if the worm shaft diameter were relatively large.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. A worm set including, in combination, a worm gear and a worm, said worm gear having a toothed sector the arc of which is less than the circumference of said worm gear, and said worm having a threaded portion with two end portions at least one of which is adapted for jamming against a side surface of the uncut portion of said worm gear.

2. A worm set including, in combination, a worm gear and a worm, said worm gear having a toothed sector the arc of which is less than the circumference of said worm gear, and said worm having a threaded portion with two end portions, at least one end portion being cut in a plane defined by a side surface of said worm gear when said one end portion is in abutting relationship with said surface.

3. Apparatus according to claim 2 in which each end portion of said worm threaded portion is cut in a respective plane as is defined by a respective one of opposite side surfaces of said worm gear when each of said end portions is in abutting relationship with a respective one of said surfaces.

References Cited in the file of this patent

UNITED STATES PATENTS

| | | |
|---|---|---|
| 156,695 | Coffin | Nov. 10, 1874 |
| 1,301,180 | Scott | Apr. 22, 1919 |